SIGNAL SEEKING TUNERS FOR TELEVISION

Filed July 25, 1952 2 Sheets-Sheet 1

Inventor
James H. Guyton
By Willits, Helwig & Baillio
Attorneys

June 9, 1959 J. H. GUYTON 2,890,274

SIGNAL SEEKING TUNERS FOR TELEVISION

Filed July 25, 1952 2 Sheets-Sheet 2

Inventor
James H. Guyton
By Willits, Helwig & Baillio
Attorneys

United States Patent Office 2,890,274

Patented June 9, 1959

2,890,274

SIGNAL SEEKING TUNERS FOR TELEVISION

James H. Guyton, Kokomo, Ind., assignor to General Motors Corporation, Detroit, Mich., a corporation of Delaware Application July 25, 1952, Serial No. 300,887

4 Claims. (Cl. 178—5.8)

Figure 1:
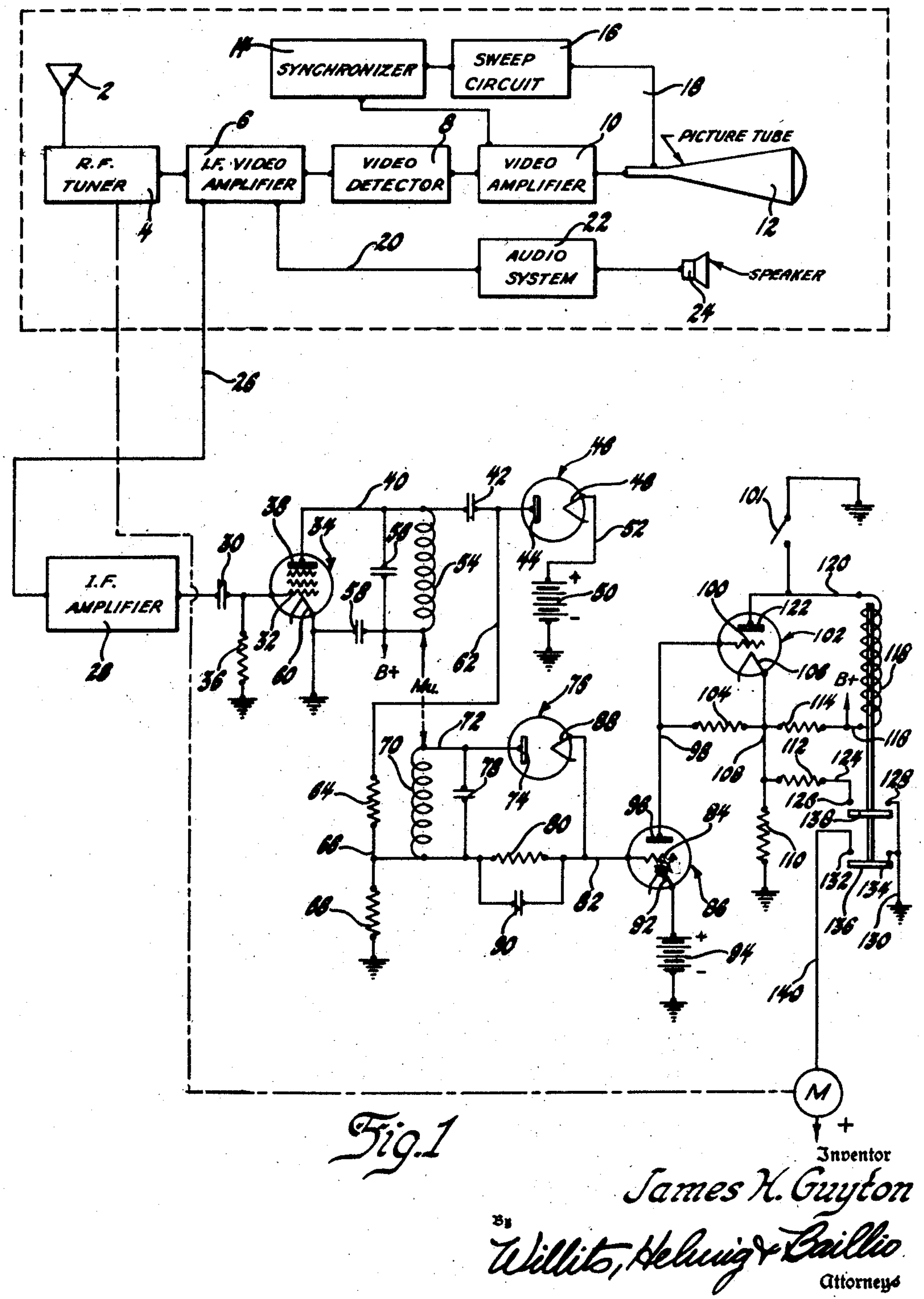

This invention relates to indexing means for automatically stopping movable means at certain desired locations, and more particularly to automatic indexing means actuated by signals produced by the arrival of the movable means at particular positions for controlling driving means for the movable means.

Various types of tuning means have been developed for radio receivers to adjust the tuners automatically to receive certain stations. One form of automatic tuning means is that referred to as "signal seeking" tuners or "signal actuated" tuning means in which means are provided to drive the tuning means over its path and to stop the same upon receipt of an incoming signal in the receiver. In general, some form of motive means is provided to drive the tuner repetitively over the frequency band for which the receiver is designed and indexing means for stopping the tuner drive is controlled by a pulse or generated voltage occurring upon receipt of a transmitted signal in the resonant circuits of the receiver. In this manner, with no means necessitating presetting, the receiver may be automatically stopped or indexed on any station that is transmitting in the broadcast frequency spectrum, provided that its signal has a strength above a predetermined minimum.

In the current models of television receivers the tuning is accomplished by merely switching from one fixed preadjusted tuned channel to another. This type of tuning is utilized since there are only a small number of transmitting stations within range of the receivers available to the user in any one locality, and therefore switching directly from one preadjusted set of components to another is feasible. Only these particular preadjusted stations can be received by the set, and no general tuning in the remainder of the band is possible.

There are many advantages to be gained in applying automatic signal actuated tuning means to television receivers. The general growth of television makes it appear that it will not be too long before the frequency band allocated to television broadcasting will be much wider and that the number of stations on the air and available to any set user will be increased materially. Thus, continuous tuning across the complete television frequency spectrum may soon be necessary. Furthermore, larger pictures on the screen make it more difficult to tune the receiver when close to the same, and the set may be much more accurately automatically tuned from a greater distance. Therefore, remote control of the television receiver is more in demand. With a larger number of stations available on the air, it will be much more convenient for the operator to tune the receiver from a remote point where he is viewing the program to sample the various programs on the air, and not have to arise and approach the receiver to switch from one station to another.

It is therefore an object in making this invention to provide automatic tuning means for television receivers that will index or stop upon receipt of an incoming signal.

It is a further object in making this invention to provide tuning means for continuously scanning the frequency spectrum for which the television receiver is designed.

It is a further object in making this invention to provide indexing tuning means for television receivers that will scan the frequency spectrum and stop on receipt of transmission from a broadcasting station.

It is a still further object in making this invention to provide automatic means for tuning a television receiver which may be operated from a remote point.

Figure 2:
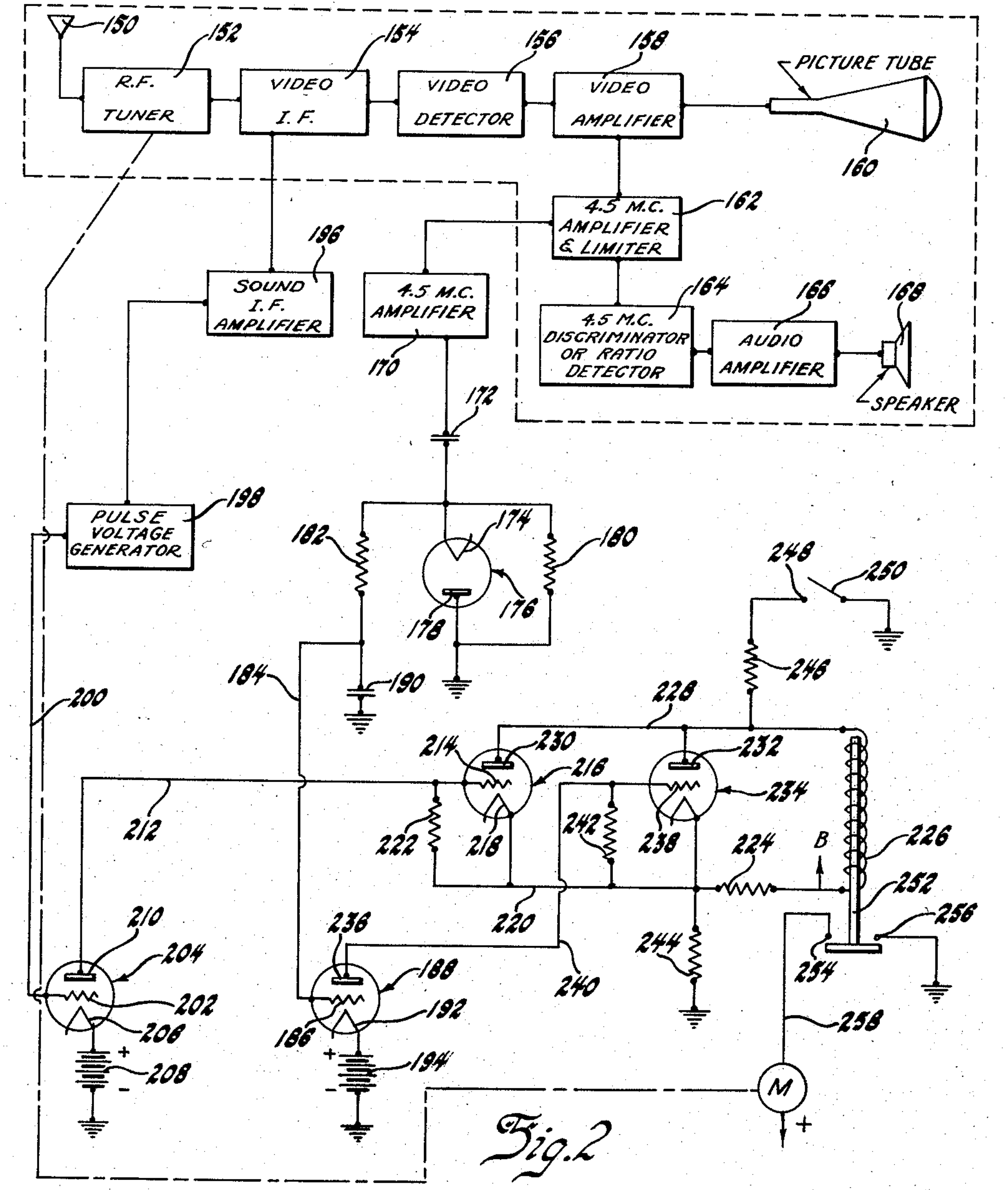

With these and other objects in view which will become apparent as the specification proceeds, my invention will be best understood by reference to the following specification and claims and the illustrations in the accompanying drawings, in which:

Figure 1 is a circuit diagram of a television receiver embodying my invention; and Figure 2 is a circuit diagram of a television receiver embodying a modified form of my invention.

In a radio broadcast receiver capable of producing only sound, there is of course a single carrier wave which is modulated by the sound to be reproduced. In television, however, inasmuch as there is simultaneous transmission and reception of a picture and the sound, there are two carrier waves, one of which is modulated in accordance with the sound and the second in accordance with the picture. These two carriers are, of course, separated in the frequency spectrum. In order to tune a television receiver properly, one manner is to index or stop the tuning means in response to the carrier signal for the sound only, and have the control means ignore the carrier for the picture portion of the transmission which would mistune the same. In other words, to apply the signal seeking tuner as it has been utilized with respect to radio broadcast receivers to television receivers, means must be provided to differentiate between the two differently modulated carrier waves or to actuate the control means for stopping the tuning means only when both video and audio carriers are present. The two figures of the drawing show two different manners of accomplishing the result.

Referring particularly to Figure 1, there is shown therein an automatic tuning arrangement which is capable of differentiating between the two modulated carrier waves in such a manner that the modulated carrier wave for the sound frequencies will operate to stop the tuning means, whereas the modulated carrier wave for the picture frequencies will be rejected and the tuning means will remain in motion. There is shown in this figure, within the dotted rectangle at the top, a block diagram illustrating the various components of a standard television receiver. These include an antenna 2, a radio frequency tuner 4, and an IF amplifier 6 connected to the output of the RF tuner and amplifying the same. A video detector 8 is connected to the output of the IF amplifier and has its output connected to a video low frequency amplifier 10, the output of which is in turn fed into the picture tube 12. A synchronizer 14 is shown connected to the sweep circuit controls 16 for the picture tube 12, the output of the sweep circuits 16 being likewise connected through line 18 to the tube 12. The IF amplifier 6 also amplifies the audio carrier waves and is connected through line 20 to the audio detecting and amplifying system 22, the output of which is fed to a loud speaker 24.

A line 26 extends from the IF amplifier 6 to a tuned amplifier 28 which is tuned to the sound IF, and the output of this amplifier is connected to one side of a condenser 30, the opposite side being connected to the control grid 32 of a vacuum tube 34 and also through a resistor 36 to ground. The plate 38 of the tube 34 is connected through line 40 to a condenser 42, the opposite terminal of which is connected to anode 44 of a diode tube 46, the cathode 48 of which is connected to the positive side of a biasing battery 50 through line 52. Line 40 is also connected to one terminal of the primary 54 of the last intermediate frequency transformer, condenser 56 being connected across said primary to form a resonant circuit tuned to the IF frequency. Terminal B+ is connected to the opposite side of the primary 54 and to one side of a condenser 58, the opposite side of which is connected to cathode 60 of the tube 34 and to ground. Anode 44 of the diode 46 is connected through line 62 to one terminal of a resistance 64, the opposite side of which is connected through line 66 to one terminal of a further resistance 68, the opposite terminal of which is grounded.

The secondary 70 of the intermediate frequency transformer is mounted in inductive relation to the primary 54, as indicated by the dotted lines and M*u*, and has one terminal connected through line 72 to the anode 74 of a second diode 76. A condenser 78 connected across said secondary 70 forms the resonant tuned circuit at intermediate frequency therewith. Line 66 is connected to the opposite terminal of the secondary 70 and to the condenser 78 as well as to a resistor 80, the opposite terminal of which is connected through line 82 to the control grid 84 of a triode tube 86. The cathode 88 of the diode 76 is directly connected to line 82. A condenser 90 is connected directly across the resistor 80. Cathode 92 of the tube 86 is connected directly to the positive terminal of a biasing battery 94, the negative terminal being grounded.

Plate 96 of the tube 86 is connected through line 98 with control grid 100 of a second triode control tube 102. A resistor 104 is connected between the cathode 106 of tube 102 and line 98. Cathode 106 is also connected to line 108 which in turn is connected to one terminal of resistance 110, one terminal of resistance 112, and one terminal of resistance 114. The opposite terminal of resistance 114 is connected through line 116 to one terminal of a relay coil 118, the opposite terminal of said relay coil being connected through line 120 to the plate 122 of the control tube 102. A source of voltage, identified as B+, is connected to line 116. Line 124 extends between resistor 112 and stationary contact 126 of a switching means actuated by the relay coil 118. A second spaced stationary contact 128 is connected to ground through line 130. A second set of spaced stationary contacts 132 and 134 are adapted to be bridged by the armature 136 actuated by the relay and mounted in spaced relation to a simultaneously actuated bridging contact 138 cooperating with the first two stationary contacts 126 and 128. Stationary contact 134 is directly connected to grounding line 130 and stationary contact 132 is connected through line 140 to a driving motor M for the tuning means. This mechanical connection is indicated by the dash and dotted line between M and the RF tuner 4.

In the operation of this system, as shown in Figure 1, the motor M is utilized for driving the tuning means to tune the receiver over the band. It therefore must be energized during the scanning or tuning movement. The grounding circuit for the motor therefore must be closed during this portion of the cycle, necessitating the energization of relay coil 118, and therefore conduction by the tube 102. Under normal circumstances, with no incoming signal in the receiver, grid 84 of the first triode 86 is biased negative a sufficient amount to prevent conduction through this tube. The voltage of the grid 100 will therefore be sufficiently high to permit this tube to conduct, maintaining relay coil 118 energized so that it attracts its armatures 136 and 138 and closes the two associated switches. In order to inaugurate the scanning action, grounding switch 101 in the plate circuit of the tube 102 is momentarily closed, which energizes the relay coil 118 through an obvious circuit from B+, starting the motor and moving the tuning means away from its in-tune position on the last station. As soon as the tuner has moved sufficiently so that no incoming signal is present, the switch 101 may be released and conduction through the tube 102 will maintain the relay coil 118 energized until another broadcast signal is received. When such a signal is encountered, a positive pulse is applied to line 82, as will be described, which pulse drives the grid 84 of the tube 86 positive and the tube conducts. This reduces the voltage at the grid 100 to a point where conductance through tube 102 is insufficient to maintain the relay coil 118 energized to hold up its armature, and it therefore releases the same, breaking the motor circuit and stopping the tuner.

The amplifier 28 is tuned to the resonant IF frequency of the audio system, and therefore develops therein a signal whose voltage increases upon the arrival at the antenna of a signal. The amplifier 28 may be of several stages and the last tube thereof, which is shown independently as tube 34, feeds into the last IF transformer 54—70. When the voltage on line 40 increases due to the interception of a transmitted signal by the antenna 2, this voltage is rectified by the diode 46 and a direct current voltage appears on line 62, if the strength of the incoming signal is sufficient to overcome the biasing voltage 50. A time constant circuit is supplied for this signal consisting of condenser 42 and resistors 64 and 68. This portion of the control circuit is designed to provide peak rectification in the diode. It is also to be noted that this signal is taken from the primary 54.

At the same time the incoming signal induces a corresponding voltage in the secondary 70 which is rectified in diode 76 and applies a voltage across the time constant circuit consisting of resistor 80 and condenser 90. This circuit is designed to have a much shorter time constant than the first, so that if a signal is applied thereto of high amplitude but short duration, it will rapidly be dissipated. These two signals developed by diodes 46 and 76 respectively are connected in opposed relation so that one tends to cancel the other above the bias voltage. This type of system is disclosed in my copending application Serial No. 141,063, filed January 28, 1950, which issued as Patent No. 2,764,675 on September 25, 1956. If the signal applied to the diodes 46 and 76 is of sufficiently slow variation, then the control pulse on line 82 resulting from the opposition of these rectified voltages will be substantially a given percentage of the value of the biasing voltage, the higher amplitude voltages cancelling out, since the two time constant circuits do not cause any differentiation under these circumstances. The wave form of these opposed voltages and the resulting control pulse may be varied and determined by the selectivity of the coupling in the intermediate frequency transformer.

If, however, a short sharp pulse is applied to the control system, the time constants of condenser 90 and resistor 80 are sufficiently short that the voltage developed in the secondary 70 is dissipated and, therefore, no retained voltage is available to oppose that voltage developed in the time constant circuit 42, 64, 68, and no control pulse will appear on line 82. In other words, by having a long time constant circuit in the output of the diode 46 which is opposed by a short time constant circuit in the output of the diode 76, there is provided a circuit which will respond or produce a control pulse from a long even modulation such as that available in a modulated carrier for producing sound, but will not respond to a carrier which is modulated in accordance with sharp short peaks such as noise or picture modulation, or standard synchronizing pulses which constitute 25% modulation in short pulses at 15,750 c.p.s. in standards of video transmission. Therefore the present system will differentiate between the audio and the video carriers. It will stop the tuning means in response to the arrival of the audio modulated wave, but will not index or stop as the tuner passes through the video modulated wave. Thus all that is necessary for the operator to do to pass on to the next station after one station has been received is to momentarily close switch 101, which immediately energizes relay coil 118, closing the motor circuit to M and driving the tuning means along to scan the band. If the next signal appearing in the amplifier 28 is the carrier modulated with video short sharp pulses, the signal developed by one of the two opposed diodes will be dissipated by the time constant circuit 90, 80, so that it cannot oppose the other portion of the signal developed by diode 46, and no positive control pulse will appear on line 82 to drive grid 84 positive so that tube 86 conducts to drive grid 100 of tube 102 negative and cut that tube off. The tuner will then continue through this carrier signal until it reaches the next audio frequency modulated carrier, and since that modulation is slower, and is minor since regulating bodies specify frequency modulation for audio channels of television transmitters, the difference in time constant circuits will not be effective, and the two opposed portions of the control pulse will oppose each other to develop a satisfactory control pulse on line 82 and the relay will be deenergized to index the set.

Figure 2 discloses a modified form of my invention. In this form of my invention the indexing or stopping of the tuning means is accomplished by the simultaneous tuning in of both audio and video modulated carrier waves. The driving means for the tuning means is controlled by two tubes and will not be indexed or stopped unless two control pulses are received, one at each tube, at the same time. The appearance of only one control pulse at one of the tubes will not stop the driving means. In general, one very accurate triggering or control pulse is provided and this may be obtained either from the audio or the video carrier. At the same time that this control pulse is received, if the tuner is properly tuned into a television broadcasting station, there will also be a second control pulse provided by the other carrier, which is spaced in frequency from the first a definite fixed number of cycles (by Federal Regulation 4.5 megacycles). It is only necessary that one of these control pulses be selective to provide accurate tuning. The second may be relatively broad as long as it is present when the accurate pulse appears.

Thus two control tubes are provided for the control relay, one of which is in turn controlled, for example, by voltage developed by the sound modulated carrier wave to give the accurate indexing pulse and the second by a control pulse supplied by the beat frequency of the 4.5 megacycle wave due to the spacing between the audio and video carriers. This second pulse may be relatively broad in response. Thus as the driving means moves the tuner into proper position for receipt of a television station, a control voltage will be supplied through rectification of the 4.5 megacycle beat to control one of the tubes, and since this is a relatively broad response, the control tube to which it is applied will be driven to nonconductance first. The relay controlling the driving means, however, will remain energized through the conductance of the second tube. A slight further movement of the tuner will accurately tune in the modulated carrier which has been selected and the arrival of this carrier properly tuned in will force the other tube to a nonconductive condition and accurately stop the tuner. Thus, if the two carriers are received in their proper relation, the tuner will stop, but if only one carrier alone is received, the tuner will proceed inasmuch as only one control tube will be driven non-conductive and the relay will remain energized through the other.

In Figure 2 the main television receiver is illustrated in the block diagram shown in the upper portion of the figure. It consists generally of a receiving antenna 150 which is directly connected to the radio frequency tuner

152, the output of which is fed into the video intermediate frequency amplifier 154. The video intermediate frequency amplifier is connected directly to the video detector 156, the output of which is amplified by the video amplifier 158 which directly feeds the picture tube 160. The video low frequency amplifier 158 is also directly connected to an amplifier and limiter 162, the output of which is fed into a discriminator or ratio detector 164, and thence through an audio amplifier 166 to a loud speaker 168. The amplifier and limiter 162 is likewise connected to a second amplifier 170 and thence through a condenser 172 to the cathode 174 of a diode rectifier tube 176, the anode 178 of which is directly connected to ground. A resistor 180 is connected across the cathode 174 and anode 178.

A second resistor 182 is connected to the cathode and thence through line 184 to the control grid 186 of a triode tube 188. Condenser 190 is connected between line 184 and ground. Cathode 192 of tube 188 is connected to the positive terminal of a biasing battery 194, the negative terminal of which is connected to ground. The video intermediate frequency amplifier 154 is also connected to a sound intermediate frequency amplifier 196 and thence to a stopping pulse voltage generator 198 in which a positive pulse is developed upon the receipt of an incoming carrier signal. This voltage generator includes the two opposed diodes connected to the primary and secondary of the intermediate frequency transformer as set forth in detail in copending Serial No. 106,223, filed January 22, 1949, issued as Patent No. 2,652,486 on September 15, 1953, and as shown in Figure 1, but does not include the different time constant circuits included in the latter. Therefore, upon the arrival of an incoming carrier in the television receiver, the voltage generator 198 develops a positive control pulse on line 200 connected to the output of the voltage generator 198 and terminating in the control grid 202 of a triode 204. The cathode 206 of the triode 204 is connected to the positive pole of a biasing battery 208, the negative pole being connected to ground.

The plate 210 of the triode 204 is connected to line 212 which terminates in a control grid 214 of triode 216. The cathode 218 of the triode 216 is connected to interconnecting line 220. A resistor 222 is connected between lines 212 and 220. Line 220 is also connected to one terminal of a resistor 224, the opposite terminal of which is connected to one terminal of a relay coil 226. Conductive line 228 extends from the plate 230 of the triode 216 to the second terminal of the relay coil 226. Plate 232 of a second triode 234 is likewise connected to conductive line 228. The plate 236 of triode 188 is connected directly to grid 238 of triode 234 through line 240. A resistor 242 is connected between lines 240 and 220. A resistor 244 is connected between line 220 and ground. A power line is connected to one terminal of the relay coil 226 as indicated at B. A resistor 246 is connected between plate circuit 228 and a stationary contact 248 of a switch 250 which is in turn grounded. The relay coil is adapted to move its armature 252 to close a circuit between two stationary contacts 254 and 256 when energized and when deenergized to drop and open that circuit. Contact 254 is connected through line 258 with a motor M for driving the tuning means, this driving connection being indicated by a dash and dotted line between the motor M and the radio frequency tuner 152. Stationary contact 256 is directly connected to ground.

In this type of signal seeking control system the relay will not be deenergized to stop the tuning motor unless two signals appear simultaneously in the control circuit, one signal being due to the sound carrier wave and the second signal being produced by the 4.5 megacycle beat frequency since the video and audio carrier waves are, by Federal Regulation, maintained at a fixed distance apart, which is 4.5 megacycles. Therefore, if in tuning the receiver over the band a carrier is first encountered alone, a control pulse will be induced in the sound intermediate frequency amplifier 196 and also in the voltage generator 198 to control triode 204, which in turn controls triode 216, but if no 4.5 megacycle beat frequency is available to control triode 234, the relay coil will still be sufficiently energized through the latter triode to maintain its armature in energized position and the motor will not stop. However, upon continued tuning and reaching the point at which a carrier is tuned in as well as a 4.5 megacycle beat frequency, then both tubes 216 and 234 will be cut off and the relay coil 226 deenergized to drop its armature 252 and stop the motor on station.

When the two carriers are simultaneously tuned in, a pulse is developed by the sound carrier in voltage generator 198, driving the grid 202 of the triode 204 positive and causing that triode to conduct, which conductance will reduce the voltage on the grid 214 of the triode 216, causing that triode to discontinue conductance. If the picture carrier is present at the same time, a 4.5 megacycle beat frequency is generated and a control pulse will also be developed by the diode 176 in the output of the amplifier 170 thereby, which in turn drives the grid 186 of the triode 188 positive to cause that triode to conduct and in like manner the grid 238 will have its voltage reduced to cut off the triode 234. Since these two triodes 216 and 234 are in parallel across the control relay coil 226, conductance through at least one of them is necessary to complete the energizing circuit and when they both are reduced in conductance, relay coil 226 will be deenergized to drop its armature 252 and break the motor circuit.

If the operator does not desire the particular station being received, he manually closes the switch 250, 248 and a direct circuit is completed between B, through coil 226, resistor 246, switch 248, 250, to ground. As soon as the receiver has moved off station, the grids 202 and 186 have the positive control voltage removed and these tubes go back to a nonconductive condition, permitting tubes 216 and 234 to again conduct and complete the circuit through the relay coil 226. The operator may then remove pressure upon switch 250, 248, permitting it to open and the relay coil will then remain energized through the parallel circuits through the two triodes 216 and 234 and the motor will continue to run. The arrival, however, of any carrier, either the video or the audio, alone will only drive one of the triodes 216 and 234 to a nonconductive position and a sufficient amount of current will continue to flow through the other to maintain the relay coil 226 energized, but upon the arrival of the two signals simultaneously, spaced apart by 4.5 megacycles, one a video and the other an audio signal to give the 4.5 megacycle control beat, the tuner will then index correctly to stop on that station.

In either form of my invention it is only necessary to operate a switch to cause the tuner to pass to the next station and, therefore, it is very simple to supply a switch with a line of any desired length to provide remote control for a receiver.

I claim:

1. In a television receiver for simultaneously receiving an audio modulated and an associated video modulated carrier wave, a plurality of tuning means for simultaneously tuning the receiver over a plurality of predetermined bands of frequencies, said receiver including a plurality of means for generating pulses in response to the tuning in of a signal of modulated waves, driving means coupled to the tuning means, relay means operatively connected to and controlling the energization of the driving means, manual switching means connected to the relay means to provide for energization of the same to initiate movement of the driving means to start the tuning means scanning said bands of frequencies, a plurality of electronic means connected to the relay means to control the same, and a plurality of conductive means connected to each electronic means and to the different means for generating pulses upon the appearance of the modulated waves to control the conductivity of each electronic means, said electronic means together controlling the energization of the relay to stop the driving means for the tuning means on station only when both pulses are present and not when only one appears whereby automatic signal seeking tuning is provided for said television receiver.

2. In a television receiver for simultaneously receiving spaced modulated carrier waves and having means for amplifying and detecting both carrier waves, means coupled to each of said amplifying means for developing a voltage upon the receipt of said carrier waves, a plurality of tuning means for simultaneously tuning the receiver over a plurality of predetermined bands of frequencies, driving means coupled to the tuning means, control relay switching means operatively connected to and controlling the driving means, a plurality of electronic tubes connected in circuit with the control relay switching means to, together, control the energization thereof, and independent conductive means connected to the different means for developing voltages by the tuning in of the modulated carriers and to each tube to control the conductivity of said tubes, said tubes together controlling the control relay switching means and causing the driving means to stop tuning upon receipt of only both signals whereby automatic signal seeking tuning is provided for said television receiver.

3. In a television receiver for simultaneously receiving spaced modulated carrier waves and having means for amplifying and detecting both carrier waves, each amplifying and detecting means having means for developing a voltage upon the receipt of said carrier waves, a plurality of tuning means for simultaneously tuning the receiver over a plurality of predetermined bands of frequencies, driving means coupled to the tuning means, control relay switching means operatively connected to and controlling the driving means, manual switching means connected to the control relay switching means to provide for energization of the same to initiate movement of the driving means to start the tuning means scanning said bands of frequencies, two multi-element tubes connected in parallel to the control relay switching means to control the same, each tube containing a control grid, conductive means connecting each control grid with a different means for developing voltages by the appearance of carrier waves tuned in to thus control the conductance of the tubes, said tubes together controlling the energization of the control relay switching means to stop the tuning means on station whereby automatic signal seeking tuning is provided for said television receiver.

4. In a television receiver for simultaneously receiving spaced modulated carrier waves and having means for amplifying and detecting both carrier waves, each amplifying and detecting means having means for developing a voltage upon the receipt of said carrier waves, a plurality of tuning means for simultaneously tuning the receiver over a plurality of predetermined bands of frequencies, driving means coupled to the tuning means, control relay switching means operatively connected to and controlling the driving means, manual switching means connected to the control relay switching means to provide for energization of the same to initiate movement of the driving means to start the tuning means scanning said bands of frequencies, a plurality of multi-element tubes connected in parallel to the control relay switching means to control the same, and having control grids to determine their conductivity, a first biased triode connected to the grid of one of the parallel tubes and also to one of the means for developing a voltage upon the tuning in of one of said carrier waves so that the voltage in the latter will determine the flow of current through the tube, a second biased triode connected to the grid of the second parallel tube and to the other means for developing a voltage upon the tuning in of another of said carrier waves, said second tube being controlled by the voltage appearing therein so that the stopping of the driving means upon the receipt of carrier waves is controlled by voltages appearing at the different means for developing voltages simultaneously whereby automatic signal seeking tuning is provided for said television receiver.

References Cited in the file of this patent

UNITED STATES PATENTS

| | | |
|---|---|---|
| 2,487,772 | Nicholson et al. | Nov. 8, 1949 |
| 2,550,430 | Schwarz et al. | Apr. 25, 1951 |
| 2,565,876 | Nicholson | Aug. 28, 1951 |
| 2,652,310 | Scherbatskoy | Sept. 15, 1953 |